United States Patent [19]

Jurgenson

[11] Patent Number: 5,551,145
[45] Date of Patent: Sep. 3, 1996

[54] RIGID DISK DRIVE ASSEMBLY METHOD

[75] Inventor: Ryan A. Jurgenson, Hutchinson, Minn.

[73] Assignee: Hutchinson Technology Incorporated, Hutchinson, Minn.

[21] Appl. No.: 145,876

[22] Filed: Oct. 29, 1993

[51] Int. Cl.$^6$ .................................................. G11B 5/42
[52] U.S. Cl. ....................... 29/603.03; 29/596; 360/97.01
[58] Field of Search ........................ 29/603, 596, 603.03; 360/97.01, 97.02, 97.03, 103–106

[56] References Cited

U.S. PATENT DOCUMENTS

| 4,949,202 | 8/1990 | Kim | 360/78.14 |
|---|---|---|---|
| 4,992,899 | 2/1991 | Kaczeus et al. | 360/106 |
| 5,109,310 | 4/1992 | Ohkjita et al. | 360/106 |
| 5,184,265 | 2/1993 | Foote et al. | 360/106 |
| 5,189,574 | 2/1993 | Imamura et al. | 360/103 |
| 5,202,804 | 4/1993 | Takekado | 360/106 |
| 5,214,552 | 5/1993 | Haga | 360/106 |
| 5,218,496 | 6/1993 | Kaczeus | 360/106 |
| 5,243,479 | 9/1993 | Nakagoshi et al. | 360/98.01 |
| 5,264,975 | 11/1993 | Bajorek et al. | 360/97.01 |
| 5,282,099 | 1/1994 | Kawagoe et al. | |
| 5,283,704 | 2/1994 | Reidenbach | |

FOREIGN PATENT DOCUMENTS 2280535  1/1995  United Kingdom.

Primary Examiner—Carl E. Hall
Attorney, Agent, or Firm—Faegre & Benson LLP

[57] ABSTRACT

A low component count and low profile disk drive includes a circuit board with a stiffening layer of stainless steel, a rigid magnetic disk mounted to a spindle motor, and head suspension assemblies mounted to an actuator bearing. The spindle motor and actuator bearing are mounted to the circuit board. Integrated circuits are mounted to the same side of the circuit board as the disk. A voice coil and a magnet assembly for driving and positioning the head suspension assemblies are mounted to the actuator bearing and to the circuit board respectively.

27 Claims, 3 Drawing Sheets

RIGID DISK DRIVE ASSEMBLY METHOD

BACKGROUND OF THE INVENTION

The present invention relates generally to disk drive data storage devices. In particular, the present invention is a small and low profile rigid magnetic disk drive that can be efficiently assembled from relatively few components.

Rigid magnetic disk drives are well known and in widespread use as digital information storage devices. These disk drives typically include a spindle motor with one or more magnetic disks mounted to a metal base. One or more suspension assemblies support read/write heads over the surfaces of each disk. The suspension assemblies are rotatably mounted to the metal base by an actuator bearing. An actuator assembly, also mounted to the metal base, drives and positions the heads over the disks to access desired information tracks thereon. Integrated circuits and other electronic components of the disk drive are mounted to a circuit board. The circuit board itself is typically mounted to the side of the metal base opposite the spindle motor and disks. In other disk drives the circuit board is positioned within a recess in the metal base.

Rigid magnetic disk drives are available in a wide variety of sizes and associated storage capacities. One important and expanding segment of the disk drive market requires small, low profile drives. Modest amounts of storage capacity (e.g., 20–40 Mbytes) are often acceptable in applications for drives of this type. One disk drive commercially available from Hewlett-Packard includes two 33 mm diameter disks, and has a profile thickness of about 10–12 min.

Applications for small form factor (dimensional relationship) drives of this type will expand as their profile decreases. To be commercially viable, however, those drives must be available at relatively low cost per megabyte of storage. Since drives of this type will often be used in portable and mobile applications, they must also be sufficiently rugged to withstand shock loads. It is therefore evident that there is a continuing need for improved small form factor disk drives and methods of assembly.

SUMMARY OF THE INVENTION

The present invention is a rugged, low profile and low component count disk drive that can be efficiently manufactured to a high degree of precision. The drive includes a circuit board with conductors, one or more disks mounted to a spindle motor, and one or more head suspension assemblies with heads mounted to an actuator bearing. Integrated circuits and a connector are mounted to the board and electrically interconnected by the conductors. The spindle motor and actuator bearing are mounted to the circuit board. Leads from the motor and head are electrically interconnected to the conductors. A voice coil including leads electrically interconnected to the conductors is mounted to the actuator bearing, and drives and positions the head suspension assembly with respect to the disk.

In one embodiment the circuit board includes stainless steel or other rigidity-increasing layers of material. The integrated circuits are mounted to the same side of the circuit board as the spindle motor. The disk, spindle motor, head suspension assembly, voice coil and integrated circuits are enclosed by a cover mounted to the circuit board. A single disk embodiment of this drive has a profile of about 4–5 mm. Other embodiments with more than one disk and therefore multiplied storage capacity can be built with slightly larger profiles.

DETAILED DESCRIPTION OF TEE PREFERRED EMBODIMENTS

Figure 1:
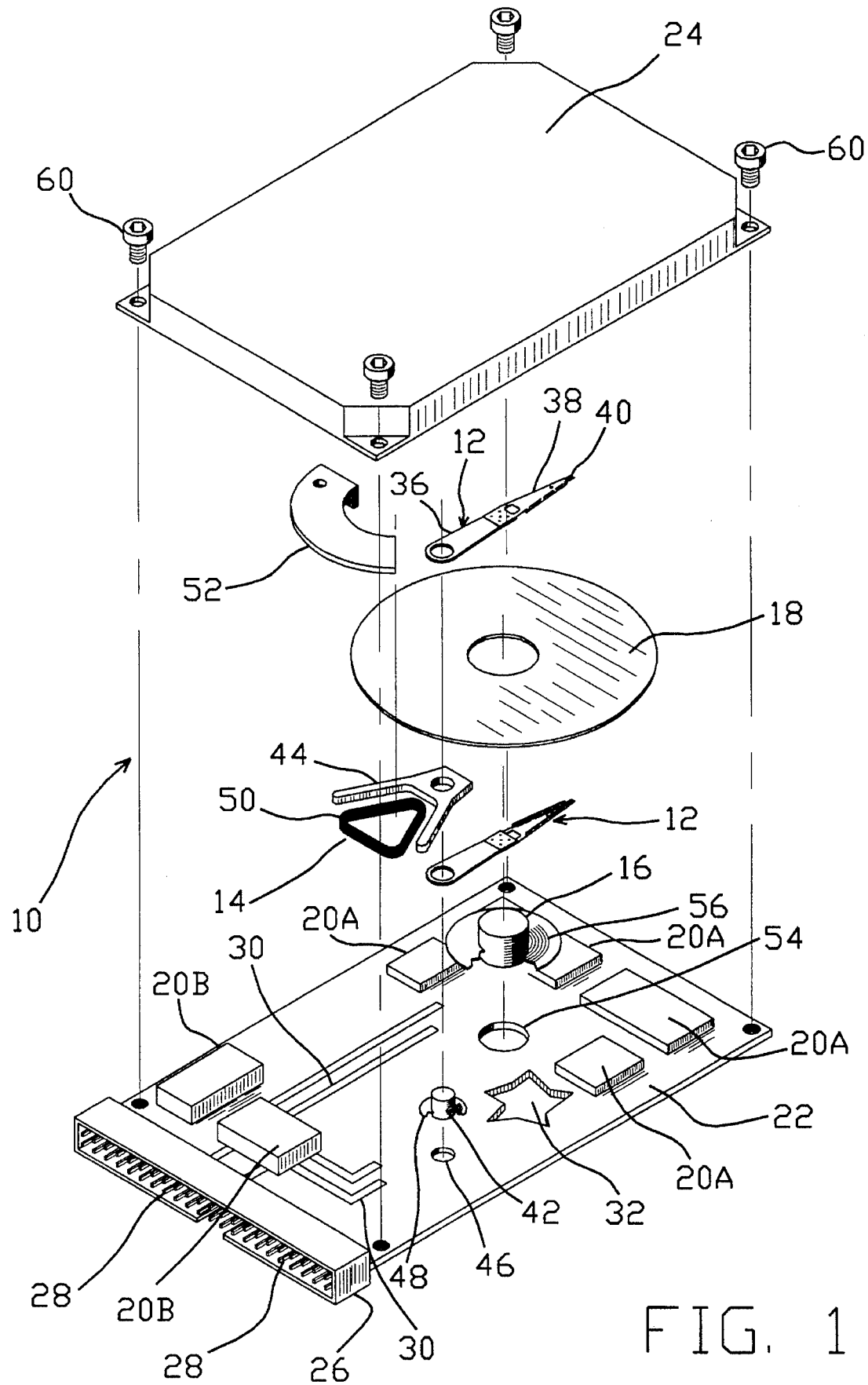
FIG. 1 is an exploded perspective view of a disk drive in accordance with the present invention.
Figure 2:
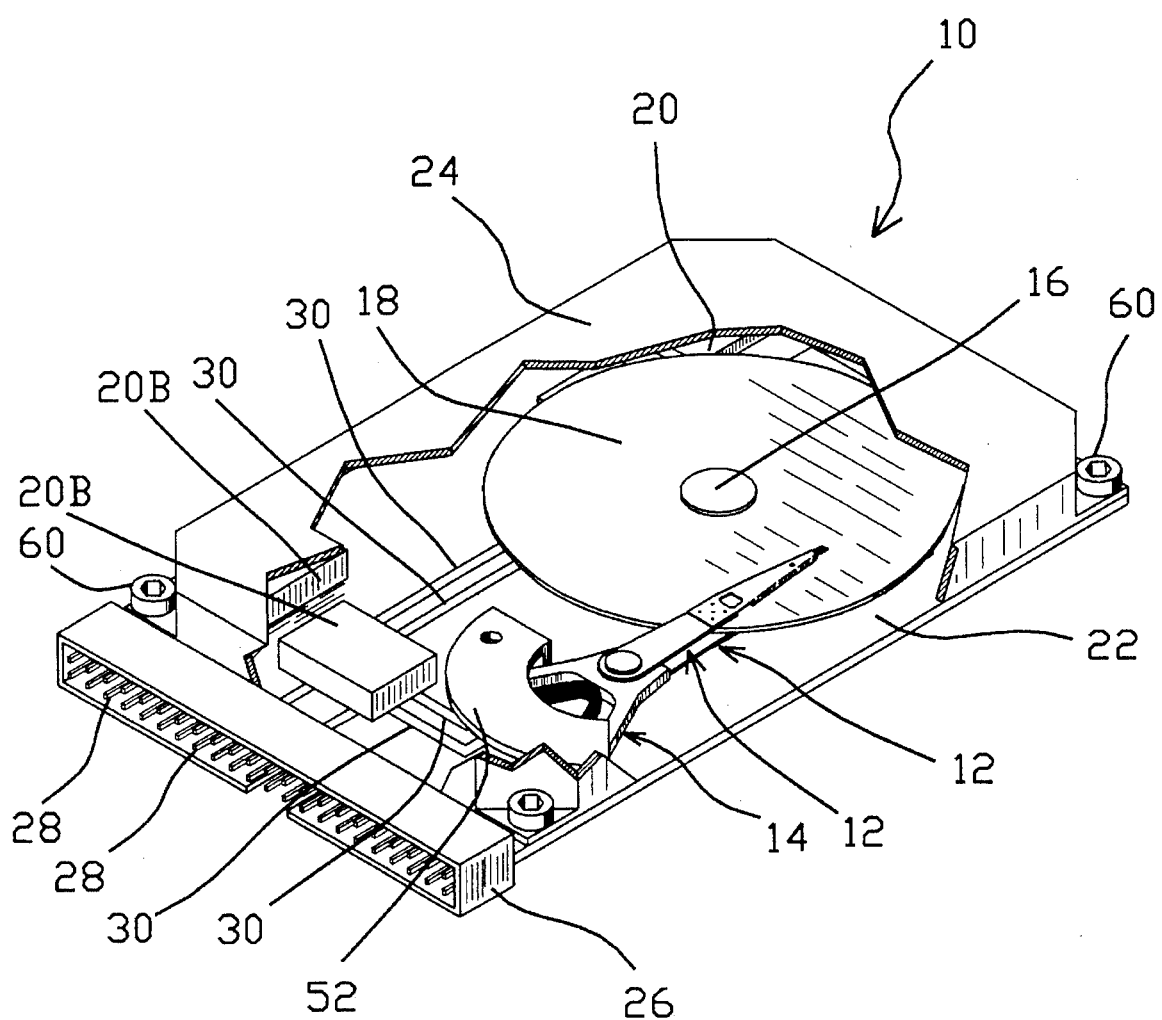
FIG. 2 is an assembled view of the disk drive shown in FIG. 1, with a portion of the cover cut away to illustrate components of the drive.

A low profile and low component count rigid disk drive 10 in accordance with the present invention is illustrated in exploded and assembled forms in FIGS. 1 and 2, respectively. As shown, disk drive 10 includes upper and lower head suspension assemblies 12, actuator assembly 14, and double-sided rigid magnetic disk 18. The disk drive 10 also includes spindle motor 16, actuator bearing 42, and integrated circuits (ICs) 20A and 20B, all of which are mounted to circuit board 22 and enclosed by cover 24. A connector 26 is mounted on an edge of circuit board 22 and includes pins 28 for electrically interconnecting disk drive 10 to a computer or other electronic device (not shown). In other embodiments (not shown), more than one double-sided magnetic disk 18 with corresponding head suspension assemblies 12 can be included.

Circuit board 22 functions as the base of disk drive 10. In one embodiment, circuit board 22 is a single or multi-layer board of conventional design which includes layers of fiberglass and epoxy (not individually shown), and metal foil conductors such as 30 for electrically interconnecting the above-identified components of disk drive 10 to one another and to pins 28 of connector 26. In the embodiment shown, circuit board 22 also includes one or more layers 32 of material such as stainless steel to add strength and rigidity to the circuit board.

ICs 20A and 20B are mounted on the side of circuit board 22 facing disk 18 to minimize the profile of disk drive 10. ICs 20A having a height less than the spacing between circuit board 22 and disk 18 can be positioned below the disk. Other ICs 20B requiring greater headroom are positioned beyond the periphery of disk 18. Pins (not separately shown) of ICs 20A and 20B can be soldered to connectors 30 in a conventional manner. In other embodiments (not shown), ICs 20A and 20B are mounted to the side of circuit board 22 opposite disk 18, and can be electrically interconnected to conductors through holes in the circuit board. ICs 20A and 20B perform conventional drive functions including read/write operations, servo control and motor control.

Head suspension assemblies 12 each include an actuator plate 36, load beam 38 and gimbal or flexure 40. A slider (not visible in FIGS. 1 and 2) including a magnetic read/write head is mounted to each flexure 40. In the embodiment shown, load beams 38 are welded to actuator plates 36. Ends of actuator plates 36 opposite flexures 40 have apertures sized to engage an actuator bearing 42. Suspension assemblies 12 are mounted to an actuator bearing 42 by adhesively bonding, press-fitting or thermally shrinking actuator plates 36 onto the bearing. A spacer 44 is also mounted to actuator bearing 42 between the suspension assemblies 12. Spacer 44 spaces suspension assemblies 12 from one another on opposite sides of disk 18, and positions the suspension assemblies the proper distance from the disk. The read/write head actuator assembly formed by suspension assemblies 12, actuator bearing 42 and spacer 44 is mounted to circuit board 22 by press-fitting or adhesively bonding a projection on the side of the bearing opposite the suspension assemblies into bearing-receiving aperture 46 in the circuit board. A flange 48 extending from bearing 42 engages circuit board 22 and properly positions the read/write head assembly with respect to disk 18. Leads (not shown) from the read/write head extend along and are fixed to actuator plates 36 and load beam 38, and are connected to conductors 30 on circuit board 22. In response to control signals from ICs 20A and 20B, the read/write heads on suspension assemblies 12 read information from and write information to tracks (not visible) on opposite sides of disk 18.

Actuator assembly 14 is responsive to servo control signals from ICs 20A and 20B and drives the read/write head assembly about the rotational axis of actuator bearing 42 to position the read/write heads over desired tracks of disk 18. Actuator assembly 14 includes a voice coil 50 mounted to spacer 44 and permanent magnet assembly 52 mounted to circuit board 22 over the coil. Wire leads (not shown) from coil 50 are electrically connected to conductors 30 on circuit board 22.

Spindle motor 16 is mounted to circuit board 22 by adhesively bonding or press-fitting a projection from the spindle motor into a motor-receiving aperture 54 in the circuit board. Flange 56 extending from motor 16 engages circuit board 22. Disk 18 is adhesively bonded or press-fit onto spindle motor 16.

Cover 24 is mounted to circuit board 22 by bolts 60. In one embodiment of disk drive 10, cover 24 is formed from stainless steel. In addition to enclosing the components of disk drive 10 and minimizing the exposure of these components to dust, cover 24 increases the rigidity of circuit board 22.

Disk drive 10 has considerable advantages over the prior art of record. Use of the circuit board 22 as the base, the relatively low component count and the placement of ICs 20A and 20B on the side of the circuit board facing the disk, contribute to the relatively low vertical profile (about 4–5 mm) of the disk drive 10. Circuit board 22 provides sufficient rigidity to facilitate the precision operation of the components mounted thereto, thereby alleviating the need and associated height, weight, and costs of the cast metal base typically included in prior art disk drives. The rigidity of circuit board 22 is also enhanced by the layers 32 of rigid material and by cover 24.

Disk drive 10 is also rugged. The precision assembly process described below enables the drive to be manufactured with relatively small spaces between the lower suspension assembly 12 and circuit board 22, and between the upper suspension assembly 12 and cover 24. For example, the gap between circuit board 22 and the lower suspension assembly 12 can be less than 0.125 mm. The gap between the upper suspension assembly 12 and cover 24 can be less than 0.125 mm. In one embodiment disk drive 10 is configured to have 0.125 mm gaps between suspension assemblies 12 and the adjacent surfaces of disk 18. The maximum amount of head travel under shock loads is therefore limited. Restricting the range of head travel possible under shock limits the force to which the disk 18 can be subjected when the head engages the disk. This characteristic, along with the relatively low mass of the suspension assemblies 12, enables disk drive 10 to withstand relatively high shock loads. Disk drive 10 can therefore be used in portable and mobile applications.

Disk drive 10 can be efficiently manufactured by direct mounting. First the actuator bearing 42 and the spindle motor 16 are mounted to the circuit board 22. Then a first head suspension assembly 12 can then be mounted to the actuator bearing 42, followed by a disk 18 which can be mounted to the spindle motor 16. A spacer 44 and voice coil 50, and a second head suspension assembly 12, can be mounted to the actuator bearing 42. Permanent magnet assembly 52 is mounted to circuit board 22 over voice coil 50. If more than one disk 18 is desired, it is mounted on the spindle motor 16 over the first disk 18. Corresponding head assemblies 12 can be mounted to the actuator bearing 42. Finally, cover 24 is placed over the assembled disk drive.

Figure 3:
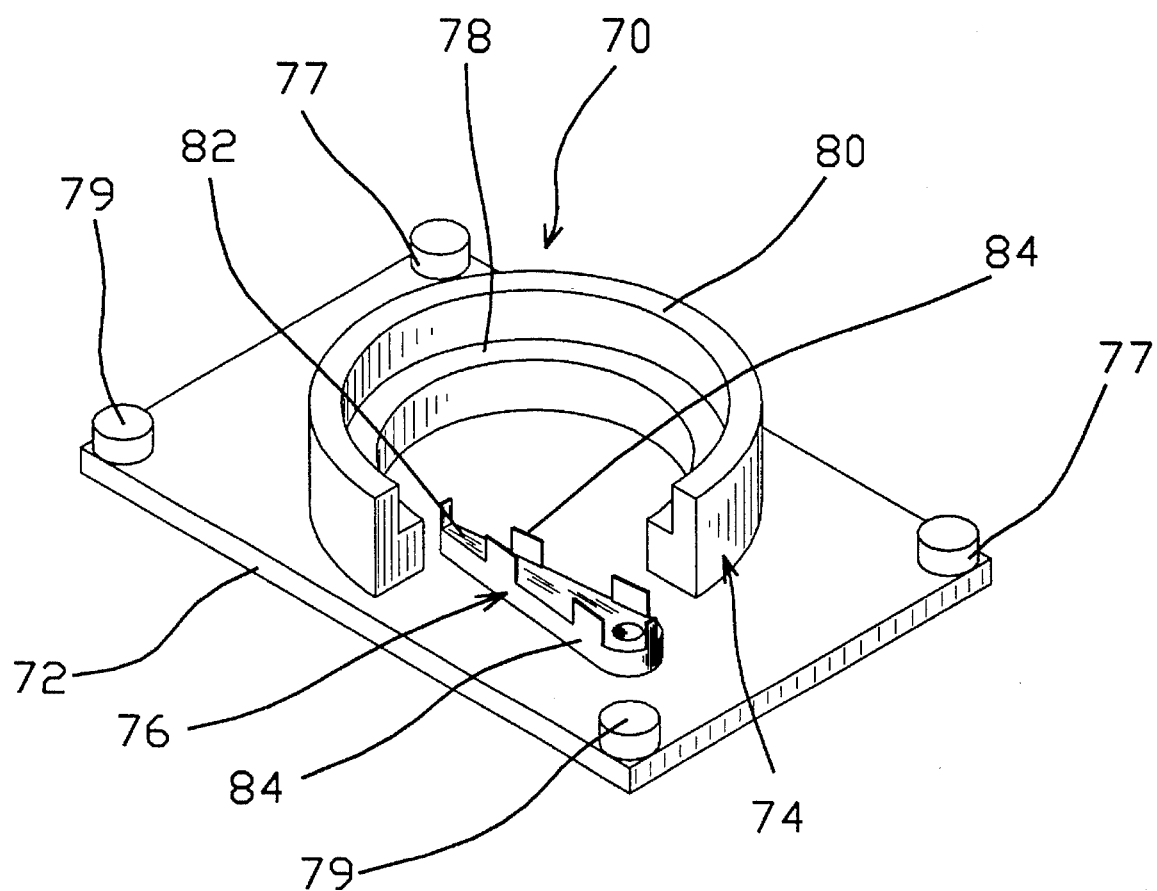
FIG. 3 is a perspective view of a transfer tool that can be used to assemble the disk drive shown in FIG. 1.
Figure 3:
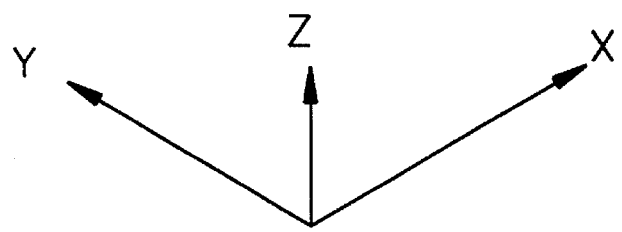

The disk drive 10 can also be efficiently manufactured to an even higher degree of precision using transfer tool 70 illustrated in FIG. 3. Transfer tool 70 includes a base 72 with a disk datum 74, read/write head actuator assembly datum 76 and circuit board datum 77. Disk datum 74 includes a disk-receiving surface 78 and guide structure 80 for accurately positioning the disk 18 on the disk-receiving surface. Actuator assembly datum 76 includes actuator assembly-receiving surface 82 and guide structure 84 for accurately positioning suspension assemblies 12 and spacer 44 on the actuator assembly-receiving surface. Circuit board datum 77 includes board-receiving surface 79. Transfer tool 70 is machined or otherwise manufactured so that when the components of disk drive 10 are positioned on the transfer tool during assembly in the manner described below, they can be repeatedly positioned with respect to one another about x, y and z axes to the degree of accuracy required for the assembled disk drive.

Transfer tool 70 can be used to assemble disk drive 10 in the following manner. First, upper suspension assembly 12 is positioned on surface 82 of actuator assembly datum 76, and is held in position by guide structure 84. Disk 18 is then positioned on surface 78 of disk datum 74. The relative position of actuator assembly-receiving surface 82 with respect to disk-receiving surface 78 about the z-axis ensures the proper z-axis positioning of the upper suspension assembly and the disk when positioned on surfaces 82 and 78, respectively. Similarly, guide structure 80 of disk datum 74 and guide structure 84 of actuator assembly datum 76 properly position the suspension assembly 12 and disk 18 with respect to one another about the x-axis and y-axis. Spacer 44, with voice coil 50 mounted thereto, is positioned over the upper suspension assembly 12 on actuator assembly datum 76. The lower suspension assembly 12 is then positioned over spacer 44 and disk 18 on the actuator assembly datum 76. The actuator assembly is then completed, and suspension assemblies 12 and spacer 44 mounted to one another, by extending bearing 42 through the apertures in the suspension assemblies and spacer and mounting the bearing to these components. Spindle motor 16 is also mounted to the central aperture in disk 18 in a similar manner.

ICs 20A and 20B are preferably mounted to circuit board 22 before spindle motor 16 and actuator bearing 42. Circuit board 22 is then positioned on surfaces 79 of circuit board datum 77 with spindle motor 16 and actuator bearing 42 extending through apertures 54 and 46, respectively. Adhesive can be used to secure spindle motor 16 and bearing 42 to circuit board 22. Proper spacing of the spindle motor 16, disk 18 and read/write head actuator assembly is therefore not disturbed.

After the spindle motor 16 and bearing 42 are mounted to circuit board 22, the assembly is removed from transfer tool 70 and turned over to provide access to the side of the circuit board on which ICs 20A and 20B are mounted. Lead wires (not shown) from the read/write head, spindle motor 16 and voice coil 50 are then soldered or otherwise electrically interconnected to the appropriate conductors 30. The permanent magnet assembly 52 is then mounted to circuit board 22. Disk drive 10 is completed by mounting the cover 24 to circuit board 22.

Although the present invention has been described with reference to preferred embodiments, those skilled in the art will recognize that changes can be made in form and detail without departing from the spirit and scope of the invention.

What is claimed is:

1. A method for assembling a disk drive, including:

providing a transfer tool having actuator bearing and spindle motor datums configured to position an actuator bearing and a spindle motor in a predetermined relationship;

providing an actuator bearing;

providing a spindle motor;

positioning the actuator bearing on the actuator bearing datum of the transfer tool;

positioning a spindle motor on the spindle motor datum of the transfer tool;

providing a circuit board including conductors; and mounting the circuit board to the actuator bearing and spindle motor while the suspension bearing and spindle motor are positioned on the transfer tool.

2. The method of claim 1 wherein:

providing the circuit board includes providing a circuit board having a bearing-receiving aperture and a motor-receiving aperture; and mounting the circuit board to the actuator bearing and spindle motor includes press-fitting the suspension bearing and spindle motor into the bearing-receiving and motor-receiving apertures, respectively, of the circuit board.

3. The method of claim 1 wherein mounting the circuit board to the actuator bearing and spindle motor include adhesively bonding the circuit board to the actuator bearing and spindle motor.

4. The method of claim 3 wherein:

providing the circuit board includes providing a circuit board having a bearing-receiving aperture and a motor-receiving aperture; and mounting the circuit board to the actuator bearing and spindle motor includes adhesively bonding the suspension bearing and spindle motor into the bearing-receiving and motor-receiving apertures, respectively, of the circuit board.

5. The method of claim 1 wherein:

providing the circuit board includes providing a circuit board having a bearing-receiving aperture and a motor-receiving aperture;

providing the actuator bearing includes providing a suspension bearing including a shaft and a flange;

providing the spindle motor includes providing a spindle motor including a shaft and a flange; and mounting the circuit board to the actuator bearing and spindle motor includes extending the shafts of the actuator bearing and spindle motor through the bearing-receiving and motor-receiving apertures, respectively, of the circuit board and engaging the flanges of the actuator bearing and spindle motor with the circuit board.

6. The method of claim 5 wherein mounting the circuit board to the actuator bearing and spindle motor further includes adhesively bonding the actuator bearing and spindle motor to the circuit board.

7. The method of claim 5 wherein mounting the circuit board to the actuator bearing and spindle motor further includes press-fitting the actuator bearing and spindle motor to the circuit board.

8. The method of claim 1 and further including mounting at least one disk to the spindle motor.

9. The method of claim 8 wherein mounting the disk to the spindle motor includes adhesively mounting the disk to the spindle motor.

10. The method of claim 8 wherein mounting the disk to the spindle motor includes press-fitting the disk to the spindle motor.

11. The method of claim 8 and further including:

providing at least one head suspension assembly each including a head and head leads; and mounting each head suspension assembly to the actuator bearing.

12. The method of claim 11 and further including electrically interconnecting the head leads to the conductors on the circuit board.

13. The method of claim 11 and further including:

providing an actuator assembly including a voice coil with leads and magnet assembly;

mounting the voice coil to the actuator bearing; and mounting the magnet assembly to the circuit board over the voice coil.

14. The method of claim 13 and further including electrically interconnecting the voice coil leads to the conductors on the circuit board.

15. The method of claim 13 and further including:

providing integrated circuits including pins; and mounting the integrated circuits to the circuit board and electrically interconnecting the pins to the conductors on the circuit board.

16. The method of claim 15 and further including mounting the integrated circuits to the same side of the circuit board as the disk.

17. The method of claim 15 and further including:

providing a rigid cover; and mounting the rigid cover to the circuit board and enclosing the disk, head suspension assemblies and actuator assembly.

18. The method of claim 1 and further including:

providing integrated circuits including pins; and mounting the integrated circuits to the circuit board and electrically interconnecting the pins to the conductors on the circuit board before the circuit board before mounting the circuit board to the actuator bearing and spindle motor.

19. The method claim 18 wherein mounting the circuit board includes mounting the circuit board to the actuator bearing and spindle motor with the integrated circuits facing the spindle motor and actuator bearing.

20. The method of claim 1 and further including:

providing head suspension assemblies and positioning the head suspension assemblies on the actuator bearing datum;

mounting the actuator bearing to the head suspension assemblies before mounting the circuit board to the actuator bearing;

providing a disk and positioning the disk on the spindle motor datum; and mounting the spindle motor to the disk before mounting the circuit board to the spindle motor.

21. A method for assembling a disk drive, including:
providing a circuit board of fiberglass - epoxy material having conductors thereon;
providing an actuator bearing;
providing a spindle motor having motor leads;
providing one or more integrated circuits having pins;
providing one or more suspension assemblies, each having a head and head leads;
bonding the actuator bearing directly to said fiberglass - epoxy material of the circuit board;
mounting the spindle motor on the circuit board;
mounting the suspension assemblies to the actuator bearing;
soldering the integrated circuit pins to the conductors on the fiberglass - epoxy circuit board:
soldering the motor leads to the conductors on the fiberglass - epoxy circuit board; and
soldering the head leads to the conductors on the fiberglass - epoxy circuit board.

22. The method of claim 21 wherein:
providing the circuit board includes providing a circuit board having a bearing-receiving aperture and a motor-receiving aperture; and
bonding the actuator bearing and spindle motor to the circuit board includes press-fitting the suspension actuator bearing and spindle motor into the bearing-receiving and motor-receiving apertures, respectively, of the circuit board.

23. The method of claim 21 wherein bonding the circuit board to the actuator bearing and spindle motor include adhesively bonding the circuit board to the actuator bearing and spindle motor.

24. The method of claim 23 wherein:
providing the circuit board includes providing a circuit board having a bearing-receiving aperture and a motor-receiving aperture; and
bonding the circuit board to the actuator bearing and spindle motor includes adhesively bonding the suspension bearing and spindle motor into the bearing-receiving and motor-receiving apertures, respectively, of the circuit board.

25. The method of claim 21 and further including mounting at least one disk to the spindle motor.

26. The method of claim 25 wherein mounting the disk to the spindle motor includes adhesively mounting the disk to the spindle motor.

27. The method of claim 25 wherein mounting the disk to the spindle motor includes press-fitting the disk to the spindle motor.

* * * * *

UNITED STATES PATENT AND TRADEMARK OFFICE
CERTIFICATE OF CORRECTION

PATENT NO. : 5,551,145
DATED : September 3, 1996
INVENTOR(S) : Ryan A. Jurgenson It is certified that error appears in the above-indentified patent and that said Letters Patent is hereby corrected as shown below:

Column 7, line 11, delete "mounting" and insert therefor --bonding--

Column 7, line 11, delete "on" and insert therefor --directly to said fiberglass-epoxy material of--

Signed and Sealed this

Twenty-fourth Day of December, 1996

Attest:

BRUCE LEHMAN

*Attesting Officer*  *Commissioner of Patents and Trademarks*